UNITED STATES PATENT OFFICE.

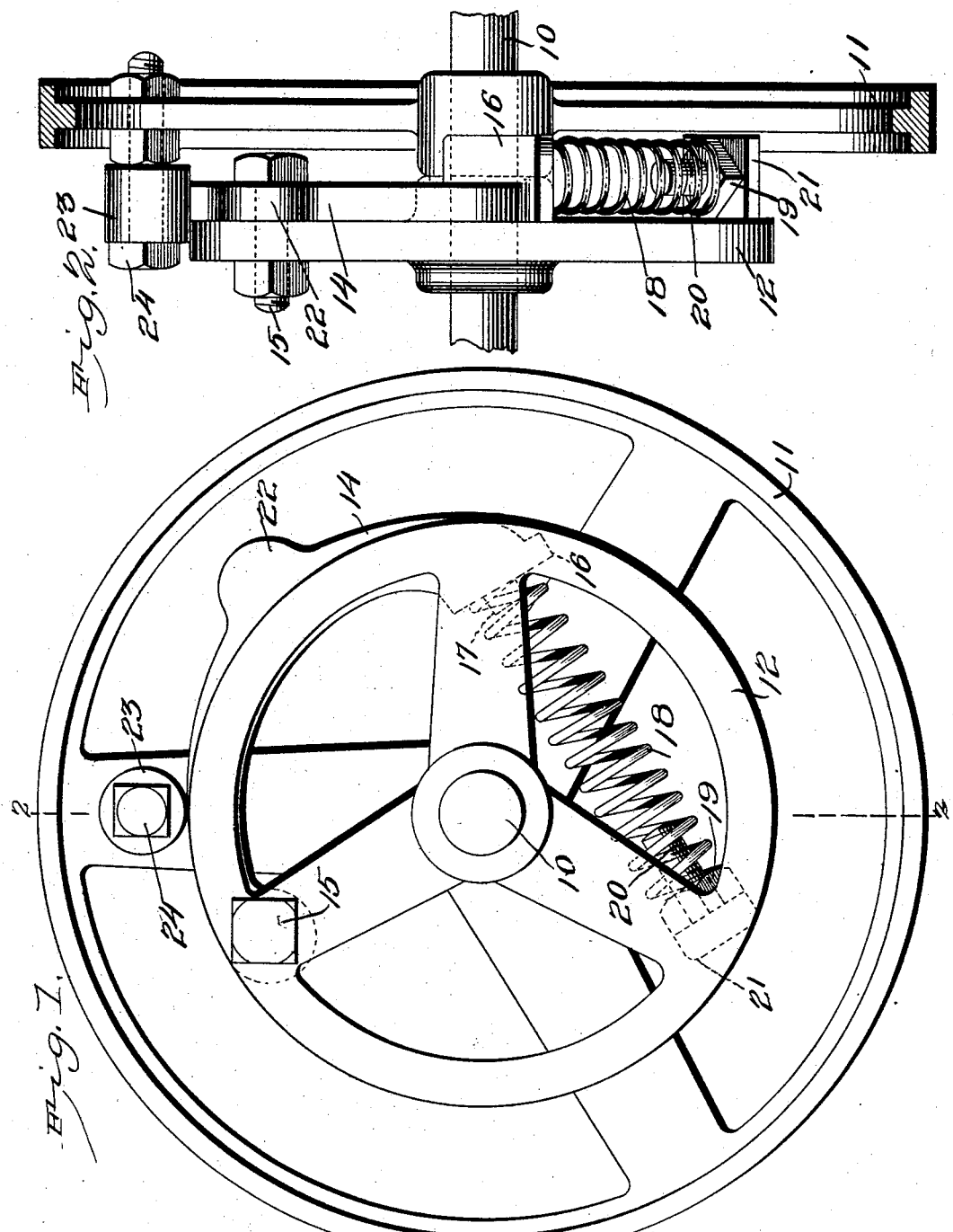

EDWIN W. MILLER, OF OTTAWA, KANSAS.

CLUTCH.

SPECIFICATION forming part of Letters Patent No. 721,964, dated March 3, 1903.

Application filed April 23, 1902. Serial No. 104,353. (No model.)

*To all whom it may concern:*

Be it known that I, EDWIN W. MILLER, a citizen of the United States, residing at Ottawa, in the county of Franklin and State of Kansas, have invented a new and useful Clutch, of which the following is a specification.

My invention relates to certain improvements in clutches of that class employed for connecting belt or toothed wheels to shafts in which the wheel and shaft will be disconnected when either is subjected to excessive strain, and has for its principal object to provide an improved form of clutch which may be employed to secure a wheel of any character to a supporting-shaft and which will be effective in either direction of rotative movement.

With this and other objects in view the invention consists in the novel construction and arrangement of parts hereinafter described, illustrated in the accompanying drawings, and particularly pointed out in the appended claims.

In the drawings, Figure 1 is a side elevation of a driven wheel and shaft, illustrating the application thereto of a yielding clutch constructed in accordance with my invention. Fig. 2 is an elevation of the same, partially in section, on the line 2 2 of Fig. 1.

Similar numerals of reference are employed to indicate corresponding parts throughout both figures of the drawings.

10 designates a suitable shaft on which is loosely mounted a driven wheel 11, the latter being in the form of a belt, gear, or sprocket wheel adapted to receive or transmit power, the device being so arranged that either the shaft or the wheel may be the driven member and the rotation be in either direction, or it may be used to connect two alining shafts. Secured to the shaft at one side of the wheel 11 is a small wheel or disk 12, to which is pivoted a curved arm 14, the arm being hung on a stud or bolt 15 at one end and at the opposite end being provided with an enlarged flattened head 16, from which projects a pin 17, the latter fitting within one end of a coiled compression-spring 18. The opposite end of spring 18 bears against the face of an adjustable nut 19, mounted on a threaded stud 20, which is carried by a lug 21, projecting laterally from one side of the wheel or disk 12, the nut being capable of adjustment in order to increase or decrease the stress of the spring. The arm 14 is curved in form, its top or outer surface being arranged in the arc of a circle equal to or less in diameter than the diameter of the wheel 12, and at the highest point of the arc or at that portion which projects the greatest distance from the periphery of the wheel 12 said arm is provided with a lug or boss 22 of triangular or circular form, said lug or boss being adapted to make contact with an antifriction-roller 23, mounted on a stud 24, which is carried by one of the spokes or other portion of the driven wheel 11. The arched face of the arm 14 is so arranged as to present a cam-like face for contact with the roller 23. This cam-like face is substantially the same on each side of the lug or boss 22, so that the roller 23 will engage the arm and through it transmit movement to the shaft. If the shaft is connected to a machine or mechanism of any kind likely to be subjected to sudden strains, the roller will act to gradually depress the arm, causing the latter to swing inwardly on its pivot-point against the action of the compression-spring 18, and if the load is excessive the shaft and the wheel 12 will remain stationary, while the antifriction-roller will ride entirely over the lug or boss 22, thus preventing the breaking of any of the portions of the machine or power-transmitting mechanism.

The device is so constructed that it may be employed for the transmission of power from the wheel to the shaft, or vice versa, or may be employed without any change in structure for connecting the two members in either direction of movement. The provision of the nut 19 enables the adjustment of the device to any desired extent, so that it may be employed on both heavy and light machinery without the necessity of making a separate device for each class of machinery.

While the construction herein described, and illustrated in the accompanying drawings, is the preferred form of the device, it is obvious that various changes in the form, proportions, size, and minor details of the structure may be made without departing from the spirit or sacrificing any of the advantages of the invention.

Having thus described my invention, what I claim is—

1. In a device of the class specified, the combination with a shaft, of a pair of wheels one of which is tight and the other loose on the shaft, an antifriction-roller carried by one of said wheels, and a spring-pressed arm connected to the second wheel, said arm having a curved roller-engaging face projecting beyond the periphery of the wheel by which it is carried to permit the gradual compression of the spring at the commencement of the clutching operation and being held in frictional contact with said roller by the spring.

2. In a device of the class specified, the combination with a shaft, of a pair of wheels one of which is tight and the other loose on the shaft, an antifriction-roller carried by one of said wheels, and a spring-pressed arm pivotally connected to the second wheel, said arm being provided with a projecting lug for engagement with said antifriction-roller.

3. In a device of the class specified, the combination with a shaft, of a wheel mounted loosely on the shaft, an antifriction-roller carried by said wheel, a second wheel secured to the shaft, a spring-pressed arm pivoted to said second wheel, the outer surface of said arm being arranged on a curved line and being provided with a roller-engaging lug or boss.

4. In a device of the class specified, the combination with a shaft, of a wheel mounted loosely on the shaft, an antifriction-roller carried by said wheel, a second wheel secured to the shaft, an arm pivoted to said second wheel and provided with curved faces projecting beyond the periphery of the wheel for engagement with the antifriction-roller in either direction of movement, a spring normally tending to hold the arm in roller-engaging position, and means for adjusting the stress of the spring.

5. In a device of the class specified, the combination with a shaft, of a wheel mounted loosely thereon, an antifriction-roller carried by said wheel, a second wheel 12 secured to the shaft, a stud projecting from said second wheel, an arm pivotally mounted on said stud and having its curved outer surface disposed partly in the arc of a circle having a diameter less than that of the said second wheel, and a roller-engaging lug or boss formed on said arm at that point where the latter projects for the greatest distance from the periphery of the wheel.

In testimony that I claim the foregoing as my own I have hereto affixed my signature in the presence of two witnesses.

EDWIN W. MILLER.

Witnesses:
HENRIETTA E. GARDE,
JAMES H. F. PRENTISS.